(12) United States Patent
Kozko

(10) Patent No.: US 9,374,529 B1
(45) Date of Patent: *Jun. 21, 2016

(54) ENABLING MULTIPLE FIELD OF VIEW IMAGE CAPTURE WITHIN A SURROUND IMAGE MODE FOR MULTI-LENS MOBILE DEVICES

(71) Applicant: Dmitry Kozko, Aventura, FL (US)

(72) Inventor: Dmitry Kozko, Aventura, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/619,724

(22) Filed: Feb. 11, 2015

Related U.S. Application Data

(63) Continuation of application No. 14/282,468, filed on May 20, 2014, now Pat. No. 9,007,431.

(51) Int. Cl.
*H04N 5/225* (2006.01)
*H04N 5/232* (2006.01)

(52) U.S. Cl.
CPC ......... *H04N 5/23238* (2013.01); *H04N 5/2258* (2013.01); *H04N 5/23216* (2013.01); *H04N 5/23296* (2013.01)

(58) Field of Classification Search
None
See application file for complete search history.

(56) References Cited

U.S. PATENT DOCUMENTS

| 8,730,299 | B1 * | 5/2014 | Kozko | H04N 5/2254 348/38 |
| 2012/0206565 | A1 * | 8/2012 | Villmer | 348/36 |
| 2013/0120602 | A1 * | 5/2013 | Huang | 348/218.1 |

* cited by examiner

*Primary Examiner* — Andy Rao
*Assistant Examiner* — Tyler Edwards
(74) *Attorney, Agent, or Firm* — Patents on Demand P.A.; Brian K. Buchheit; Scott M. Garrett

(57) ABSTRACT

A user activation of an image capture function of a mobile device is received. The image capture function is for a surround image mode. Two or more camera LENSs are approximately concurrently activated. Responsive to activating the LENSs, two or more front-side images from a first camera LENS and two or more rear-side image from a second camera LENS are optically captured. Content from the front-side images and content from the rear-side images are recorded in a non-transitory storage medium of the mobile device within a single file for a surround mode image.

20 Claims, 6 Drawing Sheets

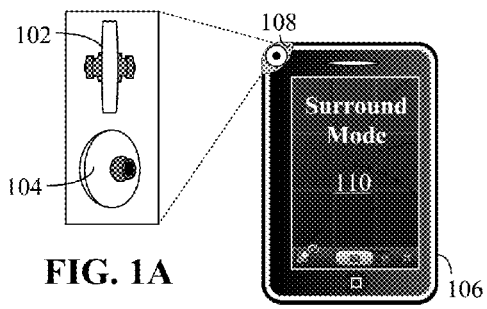
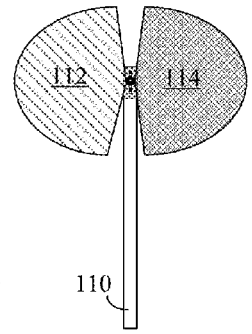
FIG. 1A
FIG. 1B
FIG. 1C
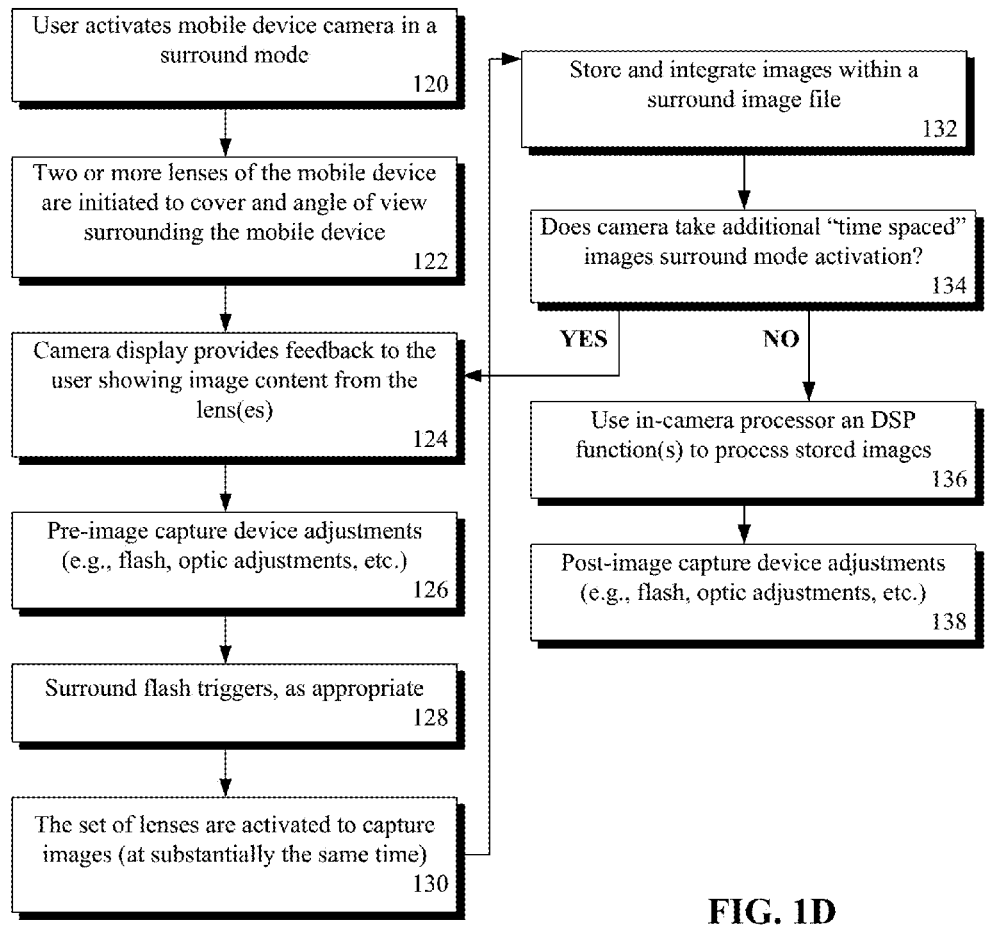
FIG. 1D

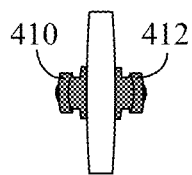
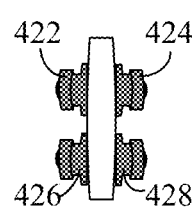
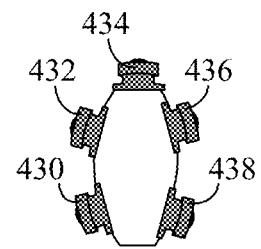
FIG. 4A      FIG. 4B      FIG. 4C
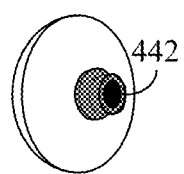
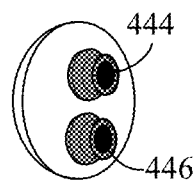
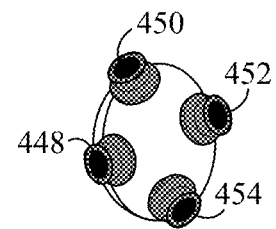
FIG. 4D      FIG. 4E      FIG. 4F
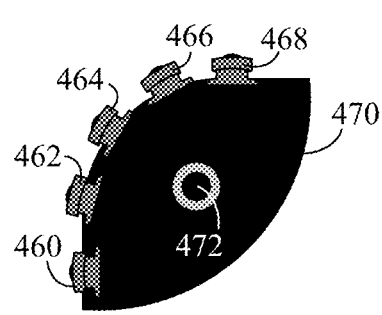
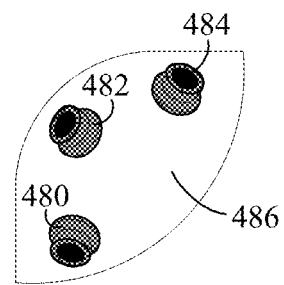
FIG. 4G      FIG. 4H

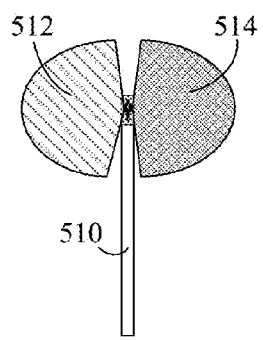
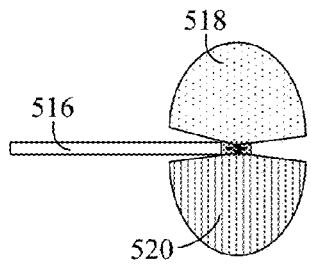
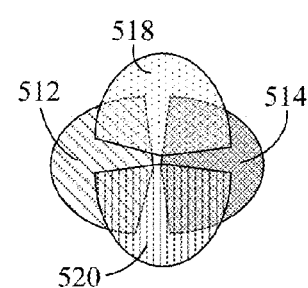
FIG. 5A  FIG. 5B  FIG. 5C
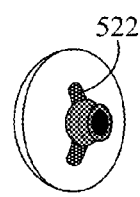
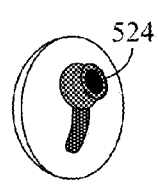
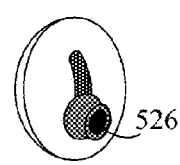
FIG. 5D  FIG. 5E  FIG. 5F
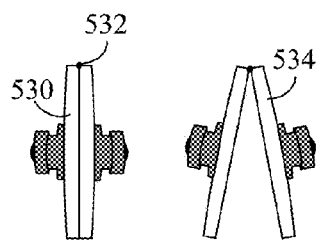
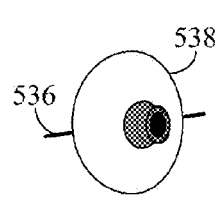
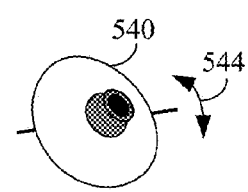
FIG. 5G  FIG. 5H  FIG. 5I  FIG. 5J

Embodiment 610
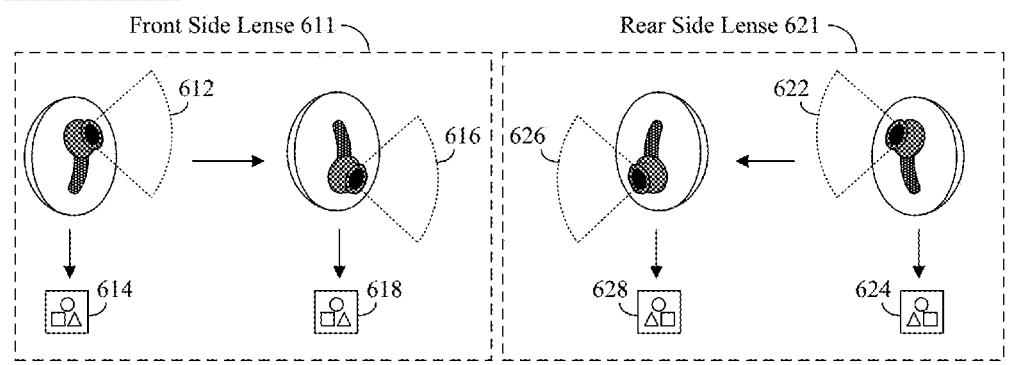
Embodiment 630
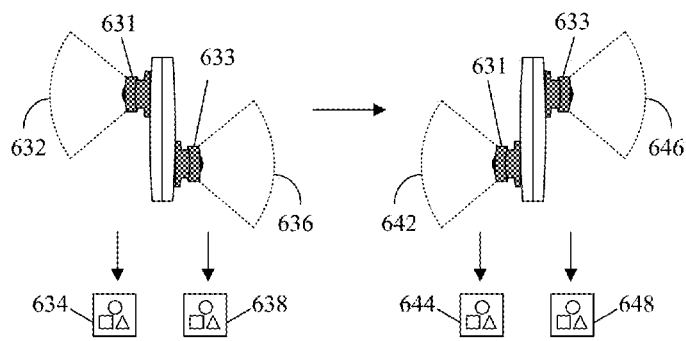
FIG. 6

ENABLING MULTIPLE FIELD OF VIEW IMAGE CAPTURE WITHIN A SURROUND IMAGE MODE FOR MULTI-LENS MOBILE DEVICES

CROSS REFERENCE

This application is a continuation of application Ser. No. 14/282,468, entitled, "ENABLING THE INTEGRATION OF A THREE HUNDRED AND SIXTY DEGREE PANORAMIC CAMERA WITHIN A CONSUMER DEVICE CASE", which was filed on 20 May 2014, and is currently pending. Application Ser. No. 14/282,468 was a continuation of Ser. No. 14/280,071 which was a continuation of application Ser. No. 14/092,393, U.S. Pat. No. 8,730,299. Application Ser. No. 14/282,468 is incorporated herein in its entirety.

BACKGROUND

The present invention relates to the field of imaging and, more particularly, to a enabling multiple field of view image capture within a surround image mode for multi-LENS mobile devices.

Increasingly, camera equipped mobile devices like smart phones and tablets are replacing formerly discrete devices, such as still and video cameras. Consumers have begun to demand additional functionality from these devices (or from digital cameras). For example, cameras able to record depth for 3D and 4D imagining have begun to emerge. Similarly, panoramic modes for image capture are becoming an increasingly popular feature of many modern mobile device operating systems.

Conventional panoramic capture modes require successive movements of a device with a single activated LENS. The movement permits different fields of view to be captured at different points in time, which can be stitched together into a panoramic view. Using conventional techniques, capturing scenes in this manner can be time consuming, and dynamic movement within the scenes (causing discrepancies in the time spaced images) can be problematic.

Another conventional panoramic technique is to utilize a single ultra-wide angle LENS to capture a panoramic scene. This ultra-wide angle LENSs may result in significant distortion, but the convenience of capturing a scene without time spacing images, outweighs these negatives to many users and manufactures. Some panoramic LENSs are optical peripherals attachable to a mobile device, such as a smartphone) to bend incoming light (using a fish-eye LENS for example) before it enters the camera's internal optical components.

The present disclosure details innovations permitting a surround image mode from a mobile device, which provides advantages of the techniques above with fewer associated negative tradeoffs.

BRIEF DESCRIPTION OF THE SEVERAL VIEWS OF THE DRAWINGS

FIGS. 1A, 1B, 1C, and 1D illustrates an enabling multiple field of view image capture within a surround image mode for multi-LENS mobile devices surround image capture mode for a mobile device 106 in accordance with embodiments of the disclosure.

FIG. 4A-4H illustrates different arrangements of LENSs for an imaging component.

FIG. 5A-5C illustrates an embodiment where two opposing LENSs can capture 360 degree images in surround mode.

FIGS. 5D, 5E, and 5F together illustrates a movable LENS on a track.

FIGS. 5G and 5H illustrates embodiments where one or more LENSs is stationary relative to a mounted surface, which is connected by hinge.

FIGS. 5I and 5J illustrates another embodiment, where a surface mounts on a rotatable axle.

FIG. 6 illustrates a set of embodiments for enabling multiple field of view image capture within a surround image mode for multi-LENS mobile devices

DETAILED DESCRIPTION

Figure 2:
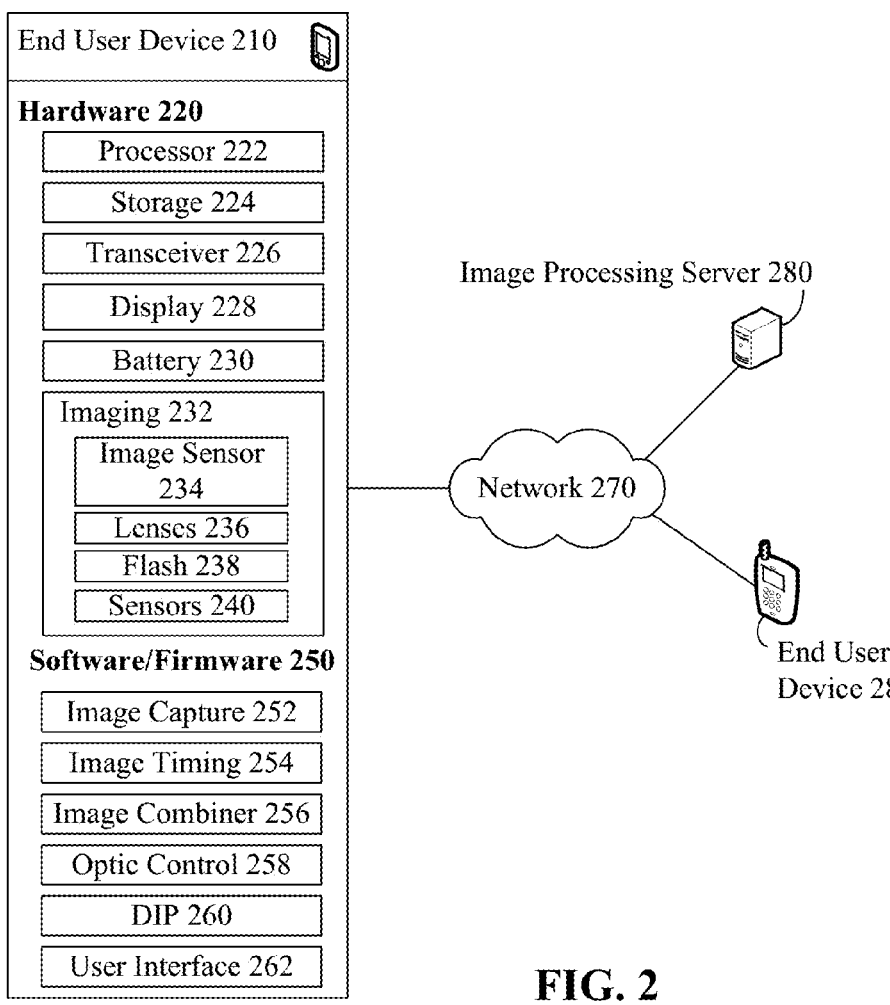
FIG. 2 illustrates a system in which an end user device having surround image mode capability in accordance with embodiments of the disclosure.

The present disclosure is a solution for enabling the integration of a three hundred and sixty degree panoramic camera within a consumer electronic device case. In the solution, a panoramic camera can be embedded within a consumer electronic device case. The camera can include one or more wide angle LENS, ultra wide angle LENS, and the like. In one embodiment, the panoramic camera can include a front and rear facing LENS which can capture an aggregate field of view of 180 degrees or greater. In one instance, the panoramic camera of the case can be triggered in response to a surround mode of a consumer electronic device. The present disclosure is a solution for enabling the integration of a three hundred and sixty degree panoramic camera within a consumer electronic device case. In the solution, a panoramic camera can be embedded within a consumer electronic device case. The camera can include one or more wide angle LENS, ultra wide angle LENS, and the like. In one embodiment, the panoramic camera can include a front and rear facing LENS which can capture an aggregate field of view of 180 degrees or greater. In one instance, the panoramic camera of the case can be triggered in response to a surround mode of a consumer electronic device. In one instance, the front and rear facing LENSs can be automatically actuated (e.g., electromechanically) to capture two or more images with differing fields of view (e.g., two 90 degree field of view images for the front LENS). In the instance, the sum of the fields of view for the images for each side (e.g., front, rear) can meet or exceed 180 degrees. In one embodiment, the images can be stitched together to form a 360 degree panorama.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1A, 1B, 1C, and 1D show a surround image capture mode for a mobile device 106 in accordance with embodiments of the disclosure. FIG. 1A shows a view of image components of the mobile device 106. FIG. 1B shows a front view of the mobile device 106. FIG. 1C shows a side view 110 of the mobile device 106. FIG. 1D shows a flow chart of a process for image capture from a mobile device placed in a surround mode.

As seen from side-view (FIG. 1C) of the mobile device 106, the surround image mode represents that images and/or video are captured from opposing sides of a mobile device 106. Thus, a LENS on one side of the mobile device captures a front-side field of view 112 while a LENS from an opposing side of the mobile device captures a back-side field of view 114. The mobile device 106 may have two or more LENSs that are each concurrently activated for the surround image mode. For instance, a "side" LENS may be utilized in a three camera embodiment, which has a field of view (not shown) between front-side view 112 and back-side view 114. In a two-LENS embodiment, each of the LENSs may be ultra-wide angle LENSs, which provide a field of view between one hundred and twenty and one hundred and eighty degrees.

As seen from FIG. 1A, the image components may be integrated together an electronic circuit. The electronic circuit's substrate can include two or more LENSs facing in opposing directions of the substrate, as shown by side view 102 and angled view 104. Unlike conventional mobile device optic systems, the field of views captured by image components may require a line-of-sight to penetrate a side of the device 106. Thus, in one embodiment, the image component may be placed at a corner of a device with a transparent outer casing, as shown by view 108.

As seen from FIG. 1B, a significant portion of a front face of the mobile device 106 can be occupied by a touch display. A user interface 110 may be presented on this touch display. The user interface 110 may include a special camera/video mode. The user interface 110 for the surround may be integrated into the operating system of the device 106 or may be part of an elective application running on the device 106.

In operation, referring to FIG. 1D, a user may activate a mobile device camera function in a surround image mode, as shown by step 120. In step 122, two or more LENSs of the mobile device are initiated to cover an area on both side of the mobile device. Initiating the LENSs can take them from a minimal (or no power) state to an active one. In surround image mode, the total captured area of the multiple LENSs (see FIG. 1C) is greater than one hundred and eighty degrees and may or may not be a continuous overlapping capture area.

In step 124, a display of the camera may provide feedback to a user showing image content from one or more LENSs. The feedback can be displayed, for example, on a user interface 110 shown on a touch screen (see FIG. 1B). In step 126, a set of pre-image capture device adjustments can occur. These adjustments may include focusing the LENS, zooming the LENS, repositioning and/or powering up a flash component (e.g., charging the capacitor), and the like. In step 128, a specialized flash (referred to as a surround flash) can be triggered as necessary/appropriate before image(s) are captured. The surround flash may illuminate an environment on both sides of a mobile device.

In step 130, the LENSs themselves are active to capture images. This image capture occurs (from the multiple LENSs) at approximately or substantially the same time. In step 132, the images that were captured are stored in a storage medium and integrated within a single surround image file. Alternatively, a folder (referred to as a surround image folder) including multiple images from different LENSs may be created. Additionally, both a surround image file and surround image folder may be used in embodiments (i.e., the surround image folder stores a set of LENS-specific raw images and the surround image file is created from these raw images).

The camera of the mobile device may or may not take a series of time spaced images when surround mode is activated. This novel function is an extension of conventional panoramic functions, where a single LENS is used to create a panoramic image by moving the device (and the capturing LENS) to create a capture region greater than otherwise possible. If a camera of the mobile device does take additional time spaced images, the process of FIG. 1D can progress from step 134 to step 124. Once all (if any) time spaced images are taken, the process may progress from step 134 to step 136. In step 136, an in-camera processor (or a remote one assuming the raw images are conveyed over a network to a remote server) may use one or more internal digital signal processing (DSP) function(s) to process stored images. In step 138, a set of post-image capture device adjustments may occur. These adjustments can change the power state of optic components, of a flash, may adjust the user interface 110, and the like.

FIG. 2 shows a system 200 in which an end user device 210 (such as mobile device 106) having surround image mode capability in accordance with embodiments of the disclosure. The end user device 210 may be a stand-alone device, where all the surround mode imagery functionality is implemented internal to the end user device 210. In another embodiment, the end user device 210 may be a network 270 connected one, where one or more of the surround mode imagery functions are performed remotely, such as by an image processing server 280. End user device 210 may be a mobile communication device able facilitating user communications with one or more remote end-user devices 282. These communications can include the transmission and exchange of surround mode images. For example, end user device may use text messaging (with attachment), video conferencing (streaming video/images captured from imaging component 232), email image conveyances, image file synchronization sharing, and other technologies to provide end user device 282 with imagery from imaging component 232.

End user device 210 may be a smart phone, a tablet computer, smart glasses, a media player, a digital camera, a smart watch, a notebook computer, a mobile gaming device, an e-book reader, and other forms of consumer electronic devices, per different contemplated embodiments. End user device 210 includes hardware 220 and software/firmware 250. Not all the elements shown in the hardware 220 and software/firmware 250 need be present for each implementation of the disclosure, and some implementations will include additional (not shown) components.

End user device includes hardware 220 and software/firmware 250. The hardware 220 includes one or more processors 222, a storage medium, a transceiver 226, a display 228, a battery 230 (or other power source), imaging components 232, and the like. The processor 222 can be a central processing unit (CPU) or a microprocessor. Processor 222 carries out instructions of a computer program by performing arithmetical, logical, and input/output operations of a system. The processor 222 can be a single core or multi-core processor.

Storage medium 222 can be a non-transitory storage medium, which refers to a medium that is not a carrier wave. Storage medium 222 stores or records information. Storage medium 222 can use magnetic storage, optical storage, electrical storage technologies, and the like.

Transceiver 226 is a component able to transmit and receive information to and from the end user device 210. Transceiver 226 communicatively links device 210 to network 270, where the communication link may be a wired or wireless link.

Battery 230 is a power source that provides electronic energy to electronics of the end user device 210. The battery 230 is often a chemical battery consisting of one or more electrochemical cells that convert stored chemical energy into electrical energy. Battery 230 may be rechargeable.

Imaging components 232 are components able to capture images and store those images onto storage medium 224. In one embodiment, the imaging components 232 are digital ones, which include image sensor 234, LENSs 236, flash 238, sensors 240, and the like. The image sensors, typically charge-coupled device (CCD) or complementary metal-oxide-semiconductor (CMOS) sensor chips, turn light into discrete signals.

The LENSs 236 each represent an optical LENS or assembly of LENSs used to make images of object for storage on storage medium 224. Each LENS 236 has a set of fundamental parameters associated, which include focal length and aperture. Each LENS 236 may also be associated with image stabilizing components and pixel density. LENSs (236) are often classified as normal LENSs, wide-angle LENSs, ultra-wide angle, long focus LENS, telephoto LENS any of which may be part of imaging components 232. Further, zero or more of a set of LENSs (236) of the imaging component 232 may be special purpose leases, such as an apochromatic (APO) LENS, a process LENS, an enlarger LENS, a fisheye LENS, a stereoscopic LENS, a soft focus LENS, an infrared LENS, an ultraviolet LENS, a swivel LENS, or a perspective control LENS.

The flash 238 is a component that produces a flash of artificial light (typically for $1/1000$ to $1/200$ of a second) at a color temperature of about 5500 K to help illuminate a scene. The flash 238 may include a high capacity capacitor chargeable to several hundred volts. Flash 238 can be an air-gap flash, a multi flash component (using multiple flashes to find depth edges or to create a stylized image), a high-current flash LED and the like. In one embodiment, the flash 238 can be an omnidirectional one, which illuminates a front and a back side of the camera (thus permitting front and rear LENSs to capture an illuminated scene). The flash may be stationary relative to the device 210, or may expend and retract within a body of the device 210. In one embodiment, the flash 238 may be an assembly of two or more discrete components, such as a front facing flash and a rear facing flash.

The sensors 240 include any of a variety of sensors used in photography. These sensors 240 can, for example, detect movement of the device 210, which is especially useful when taking time-spaced images (see step 134). Sensors 240 may include an accelerometer, a tilt sensor, a gyroscope, a global positioning system (GPS) element, a compass, a barometer, an altimeter, and the like.

The software/firmware 250 may include one or more of an image capture module 252, an image timing module 254, an image combiner 256, an optic control module 258, a digital imaging processor (DIP) module 260, a user interface module 262, and the like.

The image capture module 252 may capture images from multiple LENSs facing substantially different directions. For example, the software/firmware of module 252 may capture images substantially concurrently from a front facing camera LENS and a rear facing camera LENS of a mobile device.

The image timing module 254 module controls a timing of images from multiple different LENS(es) 236. In one embodiment, the image timing module 254 can synchronize image capture times from a front facing LENS and from a rear facing LENS. Video from multiple different (and differently facing) LENSs can also be timed. In one embodiment, the timing can be intentionally staggered and/or unified with a sensor (such as a tilt sensor or accelerometer) to take pictures after the device 210 have moved so that the LENS (es) 236 cover a different field of view than what is covered in an initial image capture. Super-pixilation (from multiple different images at different times with slightly different angles) can be achieved in one embodiment, by suitable adjustments of the image timing module 254.

The image combiner 256 module combines content from multiple different LENSs. The combiner 256 can stitch together images with common or overlapping regions. The image combiner 256 can create images including depth (3D and 4D images), in contemplated embodiments. The image combiner 256 may adjust lighting, contrast, and other image characteristics to optimize them, by combining images taken from different LENS(se) 236.

The optic control module 258 controls optical components of the system. Focus, focal length, zoom, flash, angle, and the like are all able to be controlled by program instructions of the optic control module 258 being executed by processor 222.

The digital imaging processor (DIP) module 260 uses computer algorithms to perform image processing on digital images. The DIP module 260 can perform utilize technologies for pixilation, linear filtering, principal components analysis, independent component analysis, Hidden Markov models, anisotropic diffusion, partial differential equations, self-organizing maps, neural networks, wavelets, and the like. Additional DIP processing may occur in image processing server 280 in one embodiment.

User interface 262 can be a human-to-machine interface for the end user device 210. The user interface may interact through a touch screen display (228), to a set of one or more physical buttons that may exist within the hardware 220, to wirelessly connected peripherals that receive user input and/or produce output, and the like. The user interface 262 permits the user to take pictures, video, and sound recordings using the end user device 210. The user interface 262 also permits control of hardware/software functions related to imagery and to establish and change user configuration preferences.

FIG. 3A-3E show different arrangements for positioning camera LENSs on a mobile device for enabling surround image mode as detailed herein.

Figure 3A:
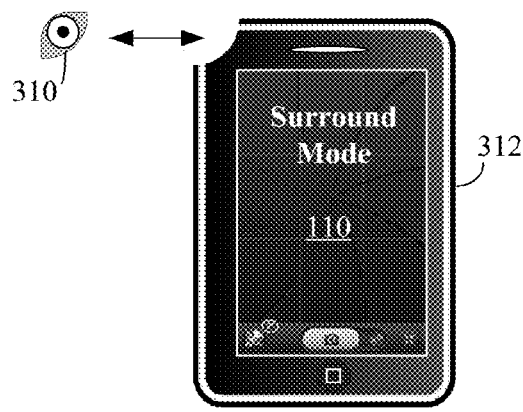
FIG. 3A-3E illustrates different arrangements for positioning camera LENSs on a mobile device for enabling surround image mode as detailed herein.

FIG. 3A shows an end-user detachable corner segment 310 for the device 312, where the corner segment includes the imaging components 232. An interface (e.g., ports) can electrically connect corner segment 310 to the device 312. The corner segment 310 can include one or more LENSs, which face in different directions. In one embodiment, a set of different corner segments 310, with different internal components and image capture/processing capabilities, can be interchangeably utilized. In this manner, a user can equip a "special purpose" imaging segment into a mobile device, can upgrade imaging functionality without having to replace the entire mobile device, and the like.

Figure 3B:
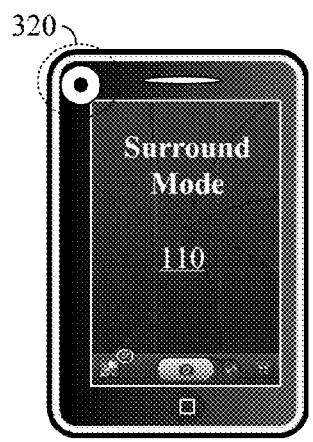
Figure 3C:
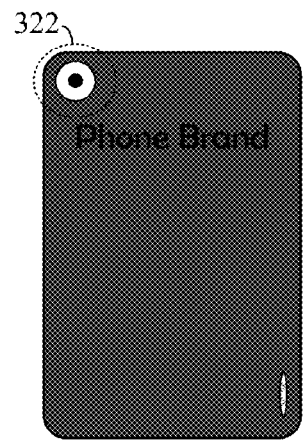

FIGS. 3B and 3C together show imaging components 320 and 322 being positioned in a common corner of a mobile device. The components 320 and 322 may not be removable (as they are in FIG. 3A), but a corner of a printed circuit board is reserved for the imaging components, which include LENSs facing in opposing directions. Using this standard, a common corner component can be easily added to a variety of mobile devices at a manufacture's fabrication facilities. Optics 320 can include one or more front facing LENSs. Optics 322 can include one or more rear facing LENSs.

Figure 3D:
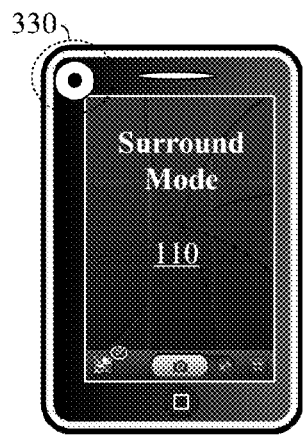
Figure 3E:
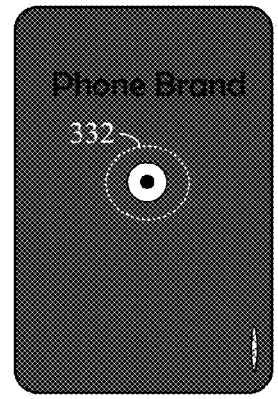

FIGS. 3D and 3E together show imaging components 330 and 332 being positioned in different spatial positions on opposing sides of the mobile device. As shown, a front LENS 330 is positioned in an upper left hand side corner and a rear LENS 332 is positioned in a central portion of a rear side of the camera. Different placement positions for LENSs 330 and 332 are contemplated. Further, multiple different LENSs may be added to each side of the mobile device.

FIG. 4A-4H show different arrangements of LENSs for an imaging component 232. Although the examples in FIG. 4A-4F assume a small optics board having LENSs facing in different directions (as suitable for embodiments represented by FIG. 3A-3C), one of ordinary skill can recognize that the shown LENS arrangements can also apply for other positions (as suitable for embodiments represented by FIGS. 3D and 3E, for example). FIG. 4G shows a substantially opaque outer casing for a camera imaging component. FIG. 4H shows a substantially transparent outer casing for a camera imaging component.

FIG. 4A-4C show different side views of a dual facing imaging component. In FIG. 4A, one front facing LENS 410 faces in an opposing direction to one rear facing LENS 412. The LENSs may have approximately equivalent or intentionally different imaging characteristics depending on implementation choices.

FIG. 4B shows two different LENSs per side of a dual facing imaging component. These different LENSs may be useful for different functions, and may have different optical characteristics. For example, one front facing 422 and one rear facing 424 LENS may be normal LENSs for standard pictures. The additional front facing 426 and rear facing 428 LENSs may be ultra-wide LENSs, which are able to capture a substantially greater field of view for a surround mode. The ultra-wide LENSs may be subject to substantially more distortion than their counterparts 422, 424. Further, images can be captured using both the front facing 422, 426 and/or both the rear-facing 424, 428 LENSs, which are able to be processed to achieve image results significantly better than is possible with a single LENS alone. That is, the different optical characteristics of the LENSs can be synergetic to produce a combined whole greater than either of the discrete parts. Use of two LENSs facing in a common direction as shown by FIG. 4B can result in very flexible optics able to serve a gambit of functions.

FIG. 4C shows a series of five 430-438 different LENSs, facing different angles about a curved surface of an image component base. The base may be a substrate into which the optical components are directly integrated. The base may also include additional components built on top a substantially flat substrate to produce fixed angles for the various LENSs 430-438. As shown, a full overlapping field of view of greater than 270 degrees can be created from the five LENSs 430-438. Software/firmware can be used to select which of the LENSs 430-438 are to be used for which image capture functions of a mobile device.

FIG. 4D-4F show angled views of different LENS arrangements. FIG. 4D represents an imaging component, which has one LENS 442 on the shown side. FIG. 4E represents an imaging component having two LENSs 444, 446 facing in the same direction. The single LENS 442 may be on one side, and two LENSs 444, 446 may be on an opposing side of the same imaging component. Alternatively, the image component can have the same number of LENS per side (as shown by FIGS. 4A and 4B). Any number of LENSs may appear on a single side of an image component, which are positioned in the same or different angles. For example, FIG. 4F shows four different LENSs 448-454 on a single side of an image component, which face at different angles relative to a substantially flat plane of that side of the image component. The sides of the image component may form substantially or approximately flat plains, or may be curved depending on implementation choices.

FIGS. 4G and 4H show an outer shell or segment 470 for an imaging component consistent with corner segment 310. In FIG. 4G, a set of LENSs 460-468 follow an outer curve of the segment 470. An additional front 472 and/or rear LENS may be included in segment 470. The outer shell of FIG. 4G does not permit light to pass through in an optically significant fashion. Thus, either a portion of the LENSs 460-468, 472) must physically extrude from the outer shell and/or the LENSs 460-468, 472 can be inset into the shell 470 but a small transparent membrane can permit light to pass to the LENSs 460-468, 472.

FIG. 4H shows a transparent outer shell for segment 486, which permits light to pass through to be captured by included LENSs 480-484. The outer shell may be polarized/un-polarized and may have additional filters, which do not negatively affect an ability of the LENSs 480-484 to capture light. A transparent outer shell permits light to pass through a variety of angles, which is highly beneficial for many surround image mode embodiments.

The varying LENSs 236 of the imaging component 232 may be stationary as shown in FIG. 4A-4H or may be able to move in order to adjust an angle of view. FIGS. 5D, 5E, and 5F together show a movable LENS on a track 522. The LENS can travel to an upward position 524 to a downward position 526 and to points in-between. When the track and/or surface of the imaging component is curved, moving a LENS along the track 522 results in significantly different regions being covered.

FIGS. 5G and 5H show embodiments where one or more LENSs is stationary relative to a mounted surface, which is connected by hinge 532. The surface can have a collapsed state 530, where the LENSs are facing in approximately or substantially opposing directions. In a butterflied state 534, the surfaces can have a substantial angle between them, which results in LENSs attached to the mounted surface capturing different content.

FIGS. 5I and 5J show another embodiment, where a surface mounts on a rotatable axle. The surface may have a first state 538, where an included set of LENSs are in front and rear facing positions. The surface can rotate 544 about the axis, so that the included LENSs are angled significantly.

Although many configurations for movable LENSs are shown (FIG. 5D-5J) others are contemplated. For example, conventional pan, tilt, zoom (PTZ) mechanisms exist, which can be utilized herein. Additionally, instead of a track 522 along which a LENS moves, a different track can be established to move the imaging component 232.

Regardless of whether the LENSs are fixed or movable, many different techniques exist for capturing images when operating in a surround mode. FIG. 5A-5C show an embodiment where two opposing LENSs can capture 360 degree images in surround mode. As shown by FIG. 5A, a device positioned in an upward state 510 is able to capture front region 512 using a first facing LENS and rear region 514 using a rear facing LENS. While still in surround image mode, the device can be tilted sideways so it is in a sideward state 516. When so positioned, the front facing LENS can capture region 518 and the rear facing LENS can capture region 520. An accelerometer or other sensor (sensors 240) can detect this movement in one embodiment. Regions 512 and 514 can be captured at substantially a first point in time, and regions 518 and 520 can be captured at substantially a second point in time. The overall captured regions are shown in FIG. 5C, which assumes a stable pivot position of the imaging component. The regions 512-520 as shown in FIG. 5C substantially overlap, so that using images captured at two points in time, a surround region is captured.

Embodiments having actuator-associated LENSs capable of movement can utilize a similar technique, where a first image is captured when a LENS is in a first position (like state 524) and a second image is captured when a LENS is in a second position (like state 526). Thus, different regions, which overlap in a surround mode (as shown in FIG. 5C, for example) can result from a mobile device maintained in a relatively stable position, in which image capture LENSs move.

Unlike prior art, where a single LENS is moved multiple times to join images into a panorama, using multiple LENSs facing different directions (even when movement occurs) is less sensitive to motions in a captured scene. For example, a full three sixty degree region is captured using two time-spaced images (FIG. 5C) per the disclosure, where an equivalent using a single LENS would require additional movements and image captures. Dynamic objects will likely be moving in a scene during these time periods, which greatly confounds problems with image stitching. Minimizing the movement (by using multiple LENSs facing in different directions) either totally eliminates dynamic movement problems (in embodiments where images are captured at a single point in time) or significantly alleviates the problem (when multiple LENSs facing different directions take images at two or more times) with dynamic artifacts.

In embodiment 610, a front-side LENS 611 and a rear-side LENS 621 can be integrated within an electronic device (e.g., camera, smart phone). In the embodiment 610, a front-side LENS 611 can capture an image 614 and a subsequent image 618. For example, LENS 611 can record an image 614 and can be electronically actuated to capture a subsequent image 618 when a user selects a shutter release interface element (e.g., shutter button). Image 614 can include a field of view (FoV) 612 and image 618 can include a field of view 616. In one instance, FoV 612, 616 can overlap resulting in two images 614, 618 with overlapping fields of view. In the instance, an image stitching algorithm can stitch the images 614, 618 into a panoramic image (e.g., 180 degree panoramic). In the embodiment 610, a rear-side LENS 621 can capture an image 624 and a subsequent image 628. For example, LENS 621 can record an image 624 and can be electronically actuated to capture a subsequent image 628. Image 624 can include a field of view (FoV) 622 and image 628 can include a field of view 626. In one instance, FoV 622, 626 can overlap resulting in two images 624, 628 with overlapping fields of view. In the instance, an image stitching algorithm can stitch the images 624, 628 into a panoramic image (e.g., 180 degree panoramic). In one instance, images 614, 618, 624, 628 can be stitched together to form a 360 degree panoramic.

In embodiment 630, a front-side LENS 631 and a rear-side LENS 633 can be integrated within an electronic device (e.g., camera, smart phone). In the embodiment, the front-side LENS 631 can capture a field of view 632 while a rear-side LENS 633 can capture an opposing field of view 636. The LENS 631 can capture an image 634 with a corresponding field of view 634 and LENS 633 can capture an image 638 with a corresponding field of view 638. The front-side LENS 631 can be actuated to a different position to capture a different field of view 642 and rear-side LENS 633 can be actuated to a different position to capture a different field of view 646. The LENS 631 can capture an image 642 with a corresponding field of view 644 and LENS 633 can capture an image 648 with a corresponding field of view 648. In the instance, an image stitching algorithm can stitch the images 634, 638 into a panoramic image (e.g., 180 degree panoramic). In one instance, images 634, 638, 644, 648 can be stitched together to form a 360 degree panoramic.

In one instance, the embodiment 610 can be a stepwise process which can be triggered responsive to an image capture functionality. In the instance, the LENS 611 can capture a first image (e.g., FoV 612) and capture a second image (e.g., 616) when the LENS 611 is completed a pan operation. It should be appreciated that pan/tilt/zoom actuation of the LENSs can be controlled via one or more user settings, system settings, and the like.

It should be appreciated that the actuation described herein can include a pan, a tilt, a zoom action. It should be appreciated that actuation can be synchronized for front and rear side LENS. That is, actuation of either front or rear side LENS can trigger the actuation of the other. In one embodiment, the LENS 611, 621, 631, 633 can capture three images each with fields of view of 60 degrees or more. In the embodiment, the images can be stitched together to form a 180 degree panorama for each side (e.g., front and rear). It should be appreciated that image field of view can include overlap which can be utilized to aid stitching operations.

It should be appreciated that field of view 612, 616, 622, 626 can be non-uniform. For example, field of view 612 can be a 25 degree field of view and field of view 616 can be a 90 degree field of view.

The flowchart and block diagrams in the FIG. 1A-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing image capture from a mobile phone comprising:
receiving a user activation of an image capture function of a mobile device, wherein the image capture function is for a surround image mode, wherein the mobile device comprises a front-facing camera as well as a rear-facing camera;
responsive to the user activation at approximately a first time concurrently activating the front-facing camera and the rear-facing camera of the mobile device to produce a first front-side image and a first rear-side image, respectively
responsive to the user activation, at approximately a second time concurrently activating the front-facing camera and the rear-facing camera of the mobile device to produce a second front-side image and a second rear-side image, wherein said front-facing camera and the rear-facing camera are interior components deposed between a front and a back side of the mobile device;
wherein the sum of the field of view of the first and second front-side images exceed 90 degrees in a horizontal or vertical plane, wherein the sum of the field of view of the first and second rear-side images exceed 90 degrees in a horizontal or vertical plane, wherein the field of view of the first and second front-side images and the first and second rear-side images overlap; and
recording in a non-transitory storage medium of the mobile device, integrated content from the first and second front-side images and integrated content from the first and second rear-side images as a surround image within a single file, wherein the surround image is an image of at least a two hundred and seventy degrees.

2. The method of claim 1, wherein the first and second cameras capture the first side and rear side images, which are images in substantially opposing directions.

3. The method of claim 1, wherein the single file has a panoramic image format at least equivalent to a sum of views of the first and second cameras combined.

4. The method of claim 1, wherein the first and the second cameras comprise ultra wide angle lenses, each of the ultra wide angle lenses having a capture angle greater than one hundred and fifty degrees, wherein raw content captured by the first and second cameras are each hemispherical images.

5. The method of claim 1, further comprising:
a processor within the mobile device processing the first and second front-side images and the first and second rear-side to create a substantially continuous image as the surround image.

6. The method of claim 1, further comprising:
capturing a first front-side image from the front-facing camera;
actuating the front-facing camera;
responsive to the actuating, capturing the second front-side image, wherein the first front-side image and second front side image have differing field of views.

7. The method of claim 1, wherein the mobile device further comprises a side facing camera positioned approximately orthogonally to the front-facing camera and the rear-facing camera:
responsive to user activation, optically capturing a side image, which is integrated into the surround.

8. The method of claim 1, wherein the mobile device is a mobile phone.

9. The method of claim 1, wherein the first front-side image and the first rear-side image lack an overlapping region of a captured scene, wherein the second front-side image overlaps with the first front-side image and the second rear-side image overlaps with the first rear-side image.

10. The method of claim 1, wherein the front-facing camera and the rear-facing camera are positionable by an actuator to adjust an angle of view of captured images, the method further comprising:

between the first time and the second time, the mobile device triggering the actuator to reposition the front-facing camera and to reposition the rear-facing camera.

11. The method of claim 8, wherein the mobile device comprises sensor for detecting movement of the mobile device, wherein the second time occurs when the sensor of the mobile device indicates that the mobile device has been positioned to ensure content gathered at the first time overlaps with content gathered at the second time.

12. A mobile device comprising:

a front-facing camera and a rear-facing camera which are interior components deposed between a front and a back side of the mobile device;

a non-transitory storage medium; and one or more processors executing program instructions to:

responsive to the user activation at approximately a first time concurrently activate the front-facing camera and the rear-facing camera of the mobile device to produce a first front-side image and a first rear-side image, respectively;

responsive to the user activation, at approximately a second time concurrently activate the front-facing camera and the rear-facing camera of the mobile device to produce a second front-side image and a second rear-side image, wherein the sum of the field of view of the first and second front-side images exceed 90 degrees in a horizontal or vertical plane, wherein the sum of the field of view of the first and second rear-side images exceed 90 degrees in a horizontal or vertical plane, wherein fields of view of the first and second front-side images and the first and second rear-side images overlap; and record in the non-transitory storage medium of the mobile device, integrated content from the first and second front-side images and integrated content from the first and second rear-side images as the surround image within a single file, wherein the surround image is a single image of at least a two hundred and seventy degrees.

13. The mobile device of claim 12, wherein the front-facing and the rear-facing cameras are positioned in a corner of the mobile device.

14. The mobile device of claim 12, wherein mobile device comprises a removable section, wherein the removable section comprises imaging components comprising the front-facing and rear-facing cameras, wherein different user pluggable removable sections enable different optical characteristics to be selectively enabled for the mobile device.

15. The mobile device of claim 12, further comprising a side facing camera positioned approximately orthogonally to the front-facing camera and the rear-facing camera.

16. The mobile device of claim 12, wherein the mobile device comprises a corner section that is optically transparent, wherein the corner section comprises imaging components for the mobile device, wherein the image components comprise the front-facing camera and the rear-facing camera.

17. The mobile device of claim 12, wherein in addition to front-facing camera and the rear-facing camera, the mobile device comprise an ultra-wide front-facing camera and an ultra-wide rear-facing camera.

18. The mobile device of claim 12, wherein the mobile device is a smart phone.

19. A computer program product comprising a non-transitory storage medium having computer usable program code embodied therewith, the computer usable program code comprising:

computer usable program code of a non-transitory storage medium configured to receive a user activation of an image capture function of a mobile device, wherein the image capture function is for a surround image mode that produces a surround image, wherein the mobile device comprises a front-facing camera as well as a rear-facing camera;

computer usable program code of a non-transitory storage medium configured to responsive to the user activation, at approximately a first time concurrently activate the front-facing camera and the rear-facing camera of the mobile device to produce a first front-side image and a first rear-side image, respectively;

computer usable program code of a non-transitory storage medium configured to responsive to the user activation, at approximately a second time concurrently activate the front-facing camera and the rear-facing camera of the mobile device to produce a second front-side image and a second rear-side image, wherein said front-facing camera and the rear-facing camera are interior components deposed between a front and a back side of the mobile device;

wherein the sum of the field of view of the first and second front-side images exceed 90 degrees in a horizontal or vertical plane, wherein the sum of the field of view of the first and second rear-side images exceed 90 degrees in a horizontal or vertical plane, wherein fields of view of the first and second front-side images and the first and second rear-side images overlap; and computer usable program code of a non-transitory storage medium configured to record in a non-transitory storage medium of the mobile device, integrated content from the first and second front-side images and integrated content from the first and second rear-side images as the surround image within a single file, wherein the surround image is a single image of at least a two hundred and seventy degrees.

20. The computer program product of claim 19, wherein the first and second cameras capture the first side and rear side images, which are images in substantially opposing directions.

* * * * *